United States Patent
Chung

(10) Patent No.: US 9,379,400 B2
(45) Date of Patent: Jun. 28, 2016

(54) HUGE STACK FOR FLAT-TUBULAR SOLID OXIDE FUEL CELL AND MANUFACTURING METHOD THEREOF

(75) Inventor: Jong Shik Chung, Ulsan (KR)

(73) Assignee: POSTECH ACADEMY-INDUSTRY FOUNDATION, Gyungbuk (KR)

( * ) Notice: Subject to any disclaimer, the term of this patent is extended or adjusted under 35 U.S.C. 154(b) by 612 days.

(21) Appl. No.: 13/639,710

(22) PCT Filed: Mar. 3, 2011

(86) PCT No.: PCT/KR2011/001459
§ 371 (c)(1),
(2), (4) Date: Nov. 5, 2012

(87) PCT Pub. No.: WO2011/126217
PCT Pub. Date: Oct. 13, 2011

(65) Prior Publication Data
US 2013/0130137 A1     May 23, 2013

(30) Foreign Application Priority Data
Apr. 9, 2010  (KR) ......................... 10-2010-0032854

(51) Int. Cl.
| H01M 8/0612 | (2016.01) |
| H01M 8/06 | (2016.01) |
| H01M 8/12 | (2016.01) |
| H01M 8/00 | (2016.01) |
| H01M 8/24 | (2016.01) |

(52) U.S. Cl.
CPC ............ *H01M 8/0618* (2013.01); *H01M 8/004* (2013.01); *H01M 8/1213* (2013.01); *H01M 8/2425* (2013.01); *H01M 8/006* (2013.01); *H01M 8/0625* (2013.01); *H01M 8/243* (2013.01); *Y02E 60/521* (2013.01); *Y02E 60/525* (2013.01); *Y02P 70/56* (2015.11)

(58) Field of Classification Search
None
See application file for complete search history.

(56) References Cited

U.S. PATENT DOCUMENTS

| 6,207,311 | B1 | 3/2001 | Baozhen et al. |
| 6,248,468 | B1 | 6/2001 | Ruka et al. |
| 6,416,897 | B1 | 7/2002 | Tomlins et al. |
| 6,429,051 | B1 | 8/2002 | Wood et al. |
| 8,962,202 | B2 * | 2/2015 | Chung .......................... 429/423 |
| 2009/0291347 | A1 | 11/2009 | Suzuki et al. |

FOREIGN PATENT DOCUMENTS

| JP | 2005243433 | 9/2005 |
| JP | 4369163 | 11/2009 |
| KR | 100538555 | 12/2005 |
| KR | 20110044657 | 4/2011 |
| WO | 2009096624 | 8/2009 |
| WO | 2009123389 | 10/2009 |

OTHER PUBLICATIONS

PCT, International Search Report, PCT/KR2011/001459 (mailed Dec. 20, 2011), 2 pages.

* cited by examiner

*Primary Examiner* — Miriam Stagg
*Assistant Examiner* — Carmen Lyles-Irving
(74) *Attorney, Agent, or Firm* — Thompson Hine LLP

(57) ABSTRACT

The invention relates to a stack for a solid oxide fuel cell and a manufacturing method thereof, and more specifically, to a stack for a high-capacity solid oxide fuel cell and a manufacturing method thereof, in which cell modules including a flat-tubular reformer integrated with flat-tubular reactors are electrically connected to form a cell bundle.

14 Claims, 8 Drawing Sheets

HUGE STACK FOR FLAT-TUBULAR SOLID OXIDE FUEL CELL AND MANUFACTURING METHOD THEREOF

This application is a National Phase of co-pending International Application No. PCT/KR2011/001459 filed Mar. 3, 2011, which claims priority to Korean Patent Application No. KR 10-2010-0032854 filed Apr. 9, 2010.

TECHNICAL FIELD

The present invention relates to a stack for a solid oxide fuel cell and a manufacturing method thereof, and more particularly to a stack for a large-capacity solid oxide fuel cell and a manufacturing method thereof, in which flat-tubular reformers and flat-tubular cells are electrically connected and structurally integrated to a cell bundle.

Moreover, the present invention relates to a stack for a solid oxide fuel cell and a manufacturing method thereof, in which the stack comprises: a monolith-type reformer manufactured by providing a conductive porous support formed of a flat tube having two sealing material grooves formed at a portion near each end thereof, forming an interconnect on the upper and lower surfaces of the support, and incorporating a reforming catalyst into an internal channel of the support; and monolith-type unit cells, each formed by forming an air flow channel on one or both flat surfaces of the central portion of the support, forming a unit cell layer on one surface of the support, and forming an interconnection layer on the other surface. In this cell stack, an even number of the unit cells are stacked above and below one reformer, and one or both ends of the support tubes are closed and vertical passages are formed through the tubes to manufacture a cell module. The cell modules are stacked vertically and arranged horizontally, and the current collecting portion of the cell module is connected to the gas manifold to manufacture a cell bundle. The cell modules are vertically and horizontally arranged to manufacture a stack module. The fuel gas and air manifolds of the stack modules are suitably connected to each other to form a stack bundle. The stack bundles are arranged vertically to manufacture a final stack. Herein, the air channel portion at the central portion of the tube in the stack module is disposed in a hot box for introducing and discharging air, and a rack for holding the fuel gas manifold is disposed at both outsides of the hot box. The cell bundles, each having the unit cells electrically connected in series and in parallel, may, if necessary, be connected with each other in series, in parallel or in series and in parallel. Thus, the cell bundle is structurally stable, and the sealing portion in the fuel gas manifolds at both ends of the cell bundle is maintained at low temperature to ensure perfect sealing. In addition, the small unit cells can be connected in parallel to increase the area of the stack, and the reformer included in the cell bundle consumes heat generated in the fuel cell, and thus, the temperature variation in the cell bundle is low and heat in the resulting stack is easy to manage. Furthermore, if a certain cell breaks down, the corresponding cell bundles can be drawn out from the hot box and replaced, indicating that the stack can be easily repaired. In addition, the three-dimensional size of the stack can become huge.

More specifically, the present invention relates to an internal reforming type huge stack and a manufacturing method thereof, in which the huge stack is manufactured by: forming fuel gas flow channels in a flat tube in the lengthwise direction, and forming two sealing material-receiving grooves along the four surfaces of each end of the flat tube at a predetermined distance, thereby forming a support; providing a reforming catalyst in the internal channel of the support, forming an interconnection layer on the upper and lower flat surfaces of the support, closing one end of the internal channel, and forming a vertical passage for discharging reforming gas between the sealing agent grooves so that a connection is formed with the internal channel, thereby manufacturing a monolith type reformer; forming an air flow channel on one or both flat surfaces of the central portion of the resulting structure, forming a unit cell layer consisting of an anode layer, an electrolyte layer and a cathode layer on one surface of the structure, forming an interconnection layer on the opposite surface, closing one or both ends of the internal channel, and forming a gas inlet or outlet vertical passage between the sealing material grooves near the closed end, thereby manufacturing a monolith type unit cell; stacking an even number of the unit cells on the upper and lower surfaces of the reformer, thereby manufacturing a cell module wherein the unit cells are electrically connected with each other in series such that fuel gas is introduced into the reformer and passes through the internal channel so as to be reformed and the reformed gas flows through the vertical passage along the inside of the adjacent unit cells in a zigzag fashion and is finally discharged through a side opposite the inlet of the reformer; horizontally arranging the cell modules, vertically stacking the arranged structures to manufacture a cell bundle of a predetermined size, connecting current collecting plates, attached to the end cells, to the fuel gas manifolds provided at both sides, placing a sealing material in the sealing material grooves, standing the resulting structure up vertically, melting the sealing material at high temperature so that it can expand between the tubes, and cooling the sealing material, thereby manufacturing a unit cell bundle having a separate fuel gas chamber including the vertical passage between two sealing materials at each of both ends; vertically and horizontally arranging the cell bundles, disposing a hot box in the central air channel portion thereof, and holding the fuel gas manifold in an open box on left and right racks outside the hot box, thereby manufacturing a unit stack module; and suitably connecting the fuel gas inlet and outlet manifolds on the stack modules to each other, thereby manufacturing a stack bundle; wherein the stack bundles may be vertically and horizontally arranged to form a three-dimensional huge structure, and the cell bundles may be electrically connected in series and in parallel with the adjacent cell bundles or the cell bundles in the adjacent stack modules.

In the above stack, fuel gas is introduced into the reformer through the gas inlet manifold provided at one end or in the middle portion of the stack module, passes through the internal channels of the unit cells in the cell module in a zigzag fashion and is discharged through the outlet manifold provided at a side opposite the inlet manifold. Meanwhile, air flows along the unit cell portion outside the tube through the manifolds at both sides of the hot box, thereby causing a fuel cell reaction. The fuel cells may be electrically connected in series and in parallel to form a three-dimensional huge structure. In addition, the cell bundle has a monolithic structure which is mechanically stable, and the fuel gas manifold portions at both ends of the tubes in the stack are maintained at low temperature so as to create a perfect seal. According to the present invention, even small unit cells may be connected in parallel to provide a large reaction area, and the internal reformers may be used in combination, and thus temperature variation in the stack is low and heat of the stack is easy to manage. In addition, when some cells are problematic, the corresponding cell bundle can be replaced. Therefore, the present invention provides a novel and more advanced stack and a manufacturing method thereof.

BACKGROUND ART

Currently, a solid oxide fuel cell (hereinafter referred to as "an SOFC"), currently referred to as a third-generation fuel cell, adopts thermochemically stable zirconia as an electrolyte with a fuel electrode serving as an anode and an air electrode serving as a cathode attached thereto. In the SOFC, a fuel gas such as hydrogen, methane, methanol, diesel or the like may be used without reformation, and an oxidizing agent such as air or oxygen is employed. Thus, SOFCs are receiving attention as high-efficiency low-pollution electric power generation technology. The SOFC utilizes as an electrolyte yttria-stabilized zirconia having a stable crystalline structure. This material exhibits oxygen ion conductivity which is characteristically governed by the temperature, and the desired conductivity for the fuel cell is attainable at 800~1000° C. Therefore, the SOFC is typically operable at a temperature of 800~1000° C. and thus adopts ceramics for the electrode material as they can withstand such a high temperature. For example, the material for the cathode to which air is introduced includes $LaSrMnO_3$, and a material for the anode at which hydrogen is introduced includes a $Ni-ZrO_2$ mixture.

In a conventional planar SOFC, a unit cell is formed by respectively coating front and back sides of an electrolyte plate serving as a support with an air electrode material and a fuel electrode material, performing a sintering process, thus forming electrolyte-electrode assemblies having a predetermined thickness, and then disposing an interconnector made of a conductive metal material between the electrolyte-electrode assemblies so that the interconnector electrically connects cathodes and anodes of upper and lower unit cells which are to be stacked. Such an SOFC also has gas channels for supplying fuel and air in both sides thereof. Such a planar fuel cell is advantageous because the electrolyte-electrode assembly is thin, but uniformity or flatness of the thickness is difficult to adjust due to the properties of the ceramic, thus making it difficult to increase the size of the fuel cell. Further, when the electrolyte-electrode assemblies and the interconnectors are alternately layered in the unit cell stack, all of the edge portions of the unit cells should be provided with a gas sealing material in order to prevent the gases of the upper and lower unit cells from mixing. Although glass which is useful as the sealing material begins to soften starting at about 600° C., it is preferred in terms of efficiency that the SOFC be typically operated at a high temperature of about 800° C. or higher. However, a perfect sealing material has not yet been found. In addition, in the unit cells for a fuel cell, there is the dangerous probability of thermal and mechanical stress during heating or cooling causing structural instability, and also, there is a high risk of gas leakage because of the crystallization of the sealing material. This makes it difficult to increase the size of the unit cells. Therefore, the planar cell is required to be further improved in various aspects in order for it to be commercialized.

With the goal of overcoming the problems of the planar cell, a cylindrical cell is disclosed in U.S. Pat. Nos. 6,207,311 B1 and 6,248,468 B1. Compared to the planar cell, the cylindrical cell has slightly lower stack power density but is significantly advantageous in terms of strength and gas sealing. Accordingly, a unit fuel cell using the cylindrical cell is formed by sequentially disposing an air electrode, an electrolyte, a fuel electrode and an interconnection layer on a porous support tube made of zirconium oxide or the like. The cylindrical cell is advantageous in that there is no need for a gas sealing material in the cell, and thus ceramic sealing problems as in the planar cell do not occur. Further, each cell is formed on a solid support, the fuel cell itself constitutes a strong ceramic structure, and the resistance to thermal expansion is high. Furthermore, because contact between the cells occurs in a reducible atmosphere, an interconnector made of a metal material may be used. However, in the case where a plurality of unit cells is connected to each other to form a stack in order to increase the capacity of the fuel cell, power current flows along a thin electrode surface in a longitudinal direction, undesirably increasing internal resistance, making it impossible to increase the size of the fuel cell. To draw out current in a radial direction in order to overcome the above problems, the inside or outside of each tube should be provided with an interconnector or wound with a wire. Also, because tubes should be disposed at predetermined intervals so as not to make contact with each other upon connection of the plurality of unit cells, unnecessary space is increased, resulting in the loss of the high power density per unit volume.

Recently, in order to solve the problems of SOFCs which use the planar cell and the cylindrical cell, there have been developed a unit cell and a unit cell stack using a flat tube type structure for increasing power density which also solves the sealing problems of the planar cell by manufacturing a fuel cell module having both a planar cell structure and a cylindrical cell structure, as disclosed in Korean Patent Laid-Open Publication No. 10-2005-0021027 and U.S. Pat. Nos. 6,416, 897 and 6,429,051. Even in this case, however, gas flow passages for supplying air or fuel electrode gases and an interconnector should be essentially provided to the outside of the flat tube type cell. Such an interconnector increases the mechanical strength of the stack and enlarges the contact area of unit cells, thus increasing power density, but because the interconnector is made of a metal, mechanical and thermal stress undesirably occurs between the electrolyte-electrode assemblies made of ceramic upon high-temperature operation. During long-term use at high temperatures, corrosion may occur due to air on the surface of the interconnector, and when the size of the flat tube type cell is increased, it is not easy to solve the thermomechanical stress between the ceramic material and the metal material.

As described above, because the solid oxide fuel cell is manufactured using a ceramic material, it is difficult to increase the unit cell area. Moreover, if the unit cells are physically or electrically connected with each other in series alone, when the performance of a specific cell is deteriorated, the entire performance of the stack is deteriorated. Due to these problems, all the cells should be perfectly manufactured and operated, but this is a task too difficult to achieve. Furthermore, when a specific cell in the stack breaks down or the performance thereof is reduced, the cell is difficult or impossible to replace or repair. In general, solid oxide fuel cells can be operated in a highly efficient manner at significantly high temperatures compared to other fuel cells, including polymer electrolyte fuel cells and molten carbonate fuel cells, and can oxidize even CO and the like. These may use various types of fuels, including coal gas, biogas and diesel gas, and can also be used in power plants having a large capacity of 1 MW or higher, and high-temperature off gas from the solid oxide fuel cells enables the generation of an additional amount of electricity. Thanks to these advantages, solid oxide fuel cells are the most promising and commercially competitive. However, due to the above-described multitude of problems, it is actually impossible to make a huge unit cell area and increase the stack capacity to 1 MW or higher.

In fuel cell reactions, a large amount of heat is generated by the oxidation of hydrogen. Thus, when the area of unit cells is increased or the number of stacks is increased to manufacture a large-sized stack, it is impossible to control the variation in temperature between the central portion and the peripheral portion of the stack, and this phenomenon causes more serious problems in solid oxide fuel cells which are operated at high temperatures. Meanwhile fuel cells use hydrogen as the reaction gas. Generally, hydrogen is produced by reforming a hydrocarbon-containing fuel gas with steam, and this hydrogen production reaction is endothermic. Thus, if a reformer is interposed between unit cells or if the anode layer or interconnection plate of a unit cell is coated with a reforming catalyst so as to cause reforming reactions at the same time, a problem in heat generation in fuel cell reactions can be controlled. However, unfortunately, an anode layer of Ni-zirconia cermet which is currently used has an excellent activity for reforming hydrocarbons, but ultimately breaks down due to severe coking caused by Ni at high temperature, and thus cannot be exposed directly to a hydrocarbon-containing fuel gas. Due to this problem, it is impossible to control the heat caused by a fuel cell reaction, if a separate reformer is not physically inserted between a unit cell and an interconnection plate.

DISCLOSURE

Technical Problem

It is an object of the present invention to provide a novel stack for a solid oxide fuel cell, in which a gas sealing material is exposed to high temperature and which has no problems of heat stress and air correction in a gas channel and an interconnector at high temperature, can maintain mechanical stability thanks to its large size, has less variation in temperature, allows easy heat management and is easy to repair.

Another object of the present invention is to provide a method for manufacturing a novel stack for a solid oxide fuel cell, in which a gas sealing material is exposed to high temperature and which has no problems of heat stress and air correction in a gas channel and an interconnector at high temperature, can maintain mechanical stability thanks to its large size, has less variation in temperature, allows easy heat management and is easy to repair.

Still another object of the present invention is to provide a novel cell module for manufacturing a solid oxide fuel cell stack, in which temperature variation in the stack is less, heat management is easy and there is no problem of air corrosion in a gas channel.

Still another object of the present invention is to provide a novel cell bundle for manufacturing a solid oxide fuel cell stack, which has large capacity and can be stably operated and in which temperature variation in the stack is less and there is no problem of air corrosion in a gas channel.

Still another object of the present invention is to provide a novel stack module for manufacturing a solid oxide fuel cell stack, in which temperature variation in the stack is less, heat management is easy and the stack is easy to repair.

Still another object of the present invention is to provide a novel flat-tubular unit cell reactor into which reformed gas can be introduced from a flat-tubular reformer through a deposited surface.

Yet another object of the present invention is to provide a novel flat-tubular reformer from which reformed gas can be introduced into a flat-tubular unit cell reactor through a deposited surface.

Technical Solution

The present invention has been made in order to solve various problems in conventional solid oxide fuel cells, including imperfect gas sealing resulting from high-temperature operation, heat stress and air correction resulting from the use of a gas channel and an interconnector, which are made of metals, difficulty in achieving a ceramic unit cell having a large area, problems associated with mechanical stability, temperature deviation and heat management, which result from an increase in the stack size, and the impossibility of repairing a stack.

To achieve the above objects, the present invention provides a method for manufacturing a stack for a solid oxide fuel cell that generates electricity using fuel gas and air, the method comprising the steps of:

forming two sealing material grooves, which can receive a sealing material during stacking, along the four surfaces of a portion proximal to each of both ends of an electrically conductive and porous flat tube at a predetermined distance, the distance and size of the grooves being such that a vertical passage can be located between the two grooves, thereby manufacturing a flat-tubular support;

forming a dense interconnection layer at the central portions of the upper and lower flat surfaces of the support so as to come into contact with the conductive support, forming a dense electrolyte layer at portions other than the central portions, sealing between the inner and outer surfaces of the support, closing one end of the internal channel of the support, forming a vertical passage for fuel gas discharge between the sealing material grooves so as to extend from the internal channel to the outside, and providing a reforming catalyst in the internal channel or preferably coating the reforming catalyst on the internal channel to a predetermined thickness, thereby manufacturing a reformer; forming an electrode-electrolyte assembly (EEA) of a fuel electrode layer, an electrolyte layer and an air electrode layer on the central portion of the upper flat surface of the support, forming an interconnection layer on the lower surface of the support so as to be connected with the conductive support, and forming an electrolyte layer on a portion of the lower surface, which excludes the interconnection layer, thereby manufacturing a unit cell base, wherein the interconnection layer and the electrolyte layer become dense, the remaining layers become porous, and the layers are formed either by conventional wet coating and sintering processes or by a dry coating process such as plasma spray coating or physical vapor deposition;

closing one or both ends of the unit cell base, and forming a vertical passage for fuel gas inlet and outlet between the sealing grooves near the closed end, thereby manufacturing a final unit cell;

stacking an even number of the unit cells on the upper and lower flat surfaces of the reformer so as to fit between the outlets and inlets of the vertical passages between the reformer and the unit cells and between the unit cells to provide a fuel gas flow passage, thereby manufacturing a cell module in which fuel gas introduced into the reformer is reformed, introduced into the unit cells on the upper and lower surfaces of the reformer, and then introduced and discharged into the adjacent unit cells in a zigzag, and finally discharged through a side opposite the inlet of the reformer;

vertically stacking a plurality of the cell modules so as to electrically connect them in series, horizontally arranging the stacked cell modules so as to electrically connect them in parallel, thereby manufacturing a cell bundle base, and then attaching a current collecting plate to the upper and lower ends of the cell bundle base, providing gas manifolds at the left and right ends of the cell bundle base such that the air electrode current collecting plate at the upper surface is connected to the left gas manifold and the fuel electrode current collecting plate at the lower surface is connected to the right gas manifold, placing a sealing material in the sealing material grooves and between the cell bundle base and the inner wall of the manifolds, filling a ceramic paste or filler at the left side or both sides of the sealing material, optionally applying a ceramic adhesive, drying or sintering the resulting structure at low temperature, thereby manufacturing a cell bundle of a monolithic structure, standing the cell bundle vertically, and melting the sealing material at high temperature so as to form a seal between the tubes and between the outer surface of the cell bundle and the inner wall of the manifold, thereby manufacturing a final cell bundle;

vertically and horizontally arranging a plurality of the cell bundles at a predetermined distance such that a central reaction portion is disposed in a hot box and the fuel gas manifolds at both ends are placed vertically on both sides outside the hot box and held on a rack serving a partition, thereby manufacturing a final stack module, wherein the rack has double walls, and the space between the double walls consists of an open box having a cross-sectional area larger than that of the cell bundle so that the cell bundles can slide horizontally into the hot box;

inserting a square ring-shaped plug of an electrically non-conductive and heat-insulating material between the cell bundle and the wall of the hot box so as to prevent hot air of the hot box from leaking to the outside and to prevent current transfer between the rack and the cell bundle, and finally closing the gap between the cell bundle and the open box on the outer wall surface of the rack so as to form on the rack an air chamber for air injection consisting of vertical and horizontal openings between the cell bundles and to allow cooling air to be blown into the air chamber to maintain the sealing material in the manifold portion at a predetermined temperature or lower so as not to melt it, thereby manufacturing a final unit stack module;

repeatedly connecting the air outlet manifolds and the air inlet manifolds to each other in series on the wall surface before and behind the hot box mounted on the stack module, or transposing two unit stack modules or a plurality of the stack modules connected in series and repeatedly connecting the inlet manifolds to each other or the outlet manifolds to each other, thereby repeatedly connecting the air manifolds to each other, and repeatedly connecting the fuel gas inlet manifolds to each other or the fuel gas outlet manifolds to each other, thereby manufacturing a stack bundle of a specific size in which the air manifolds are repeatedly connected to each other in the lengthwise direction and the fuel gas manifolds are repeatedly connected in the widthwise direction; and vertically stacking a plurality of the stack bundles, vertically integrating the fuel gas inlet or outlet manifolds, and electrically connecting the cell bundles to each other in series and in parallel through the manifolds so as to allow the generation of desired current and voltage, thereby manufacturing a three-dimensional huge stack.

The present invention also provides a solid oxide fuel cell stack manufactured by the above method.

In the stack according to the present invention, air is introduced into one side of the hot box, passes through the unit cells between the tube shells and is discharged through the opposite side. Meanwhile, hydrocarbon-containing gas is introduced into the fuel gas manifold and reformed in the reformer, and the reformed hydrogen and CO-containing gases flow in a zigzag fashion through the vertical passages connected to the internal channels of the adjacent unit cells, are discharged from the end unit cell in the cell module and are finally discharged through a fuel gas outlet manifold. Thus, two different gases (air and hydrocarbon-containing gas) do not mix with each other. In addition, the unit cells in the stack can be suitably connected in series and in parallel so as to provide the desired current and voltage. Moreover, the cell bundle that is a basic repeating unit has a monolithic structure which is structurally stable, and thus is perfectly sealed. Further, an endothermic reaction on the reformer included in the cell module can consume the heat of fuel cell reactions in the adjacent unit cells, and thus temperature variation in the cell bundle can be reduced, making it possible to increase the size of the cell bundle. Also, when the external reformer is connected to the internal reformer, managing the heat of the stack becomes easy. In addition, the cell bundle is held on the rack, and thus when a specific cell has trouble or the performance thereof is reduced, the corresponding cell bundle can be replaced and repaired.

In the present invention, in the manufacture of the support which is used for the manufacture of the stack and the unit cell for the solid oxide fuel cell stack, the outer surface of the central portion of a flat tube is grooved to a predetermined depth such that air can flow through the air channel portion not only in the horizontal direction, but in the horizontal direction.

In the reformer for the solid oxide fuel cell according to the present invention, an interconnection layer formed of a dense film is formed on the central portion of the upper and lower flat surfaces of the flat tubular support, and a dense film made of a non-conductive ceramic material, preferably an electrolyte material, is formed on the portions other than the central portion, so as to prevent the two gases from mixing with each other. Also, one end of the internal channel is closed, and a hole or slit-type vertical passage is formed through a portion near the closed end so as to extend from the internal channel to the outside of the support. Also, a catalyst is provided in the internal channel, and is preferably coated on the inner wall of the internal channel. In the reformer thus manufactured, hydrocarbon-containing fuel introduced through one end of the tube is reformed in the catalyst layer into hydrogen and CO-containing gases, which are then discharged through the vertical passage formed through the reformer at the portion near the opposite closed end, and are introduced into the internal channels of the adjacent unit cells. In addition, the lower interconnection layer is connected to the cathode layer of the adjacent unit cell, and the upper interconnection layer is connected to the anode of the adjacent unit cell.

In the present invention, the air channels on the flat surface of the support for the solid oxide fuel cell are composed of grooves having a predetermined depth and width. Thus, when the unit cells and the reformer, which are manufactured using the support, are stacked on each other, the anode layer on the grooves is electrically connected with the interconnection layer of the adjacent unit cell or the interconnection layer of the reformer, and air can vertically flow through the grooves between the stacked tubes.

In the present invention, the cell module for the solid oxide fuel cell is manufactured by stacking an even number of the unit cells on the upper and lower flat surfaces of the reformer. In the stacking process, a slurry made of a cathode or interconnection material is applied to the interconnection layer and cathode layer portions, a sealing material is placed in the sealing material grooves, and a ceramic adhesive is sufficiently applied to both sides outside the grooves. Then, the stacked structures are pressed while they are dried and sintered at a temperature of 700° C. or lower, preferably 600° C. or lower, thereby manufacturing a monolithic structure.

In the cell module for the solid oxide fuel cell according to the present invention, hydrocarbon-containing fuel gas introduced into the central reformer is reformed in the reformer into hydrogen and CO-containing gases, which are then introduced into the adjacent unit cells and flow to the next unit cells in a zigzag fashion, and are finally discharged through a side opposite the inlet of the reformer. In this cell module, the interconnection layers of the reformer are electrically connected with the unit cells, and the cathode layers of the unit cells are connected with the anode layers of the adjacent unit cells in series, and thus the lowest unit cell serves as the anode layer, and the uppermost unit cell serves as the cathode layer.

In the present invention, the intermediate manifolds for the fuel gas inlet or outlet in the solid oxide fuel cell stack are longer than the cell bundle so that the cell bundle can be replaced, if necessary.

In the present invention, in the solid oxide fuel cell stack, the stack bundles are arranged vertically separated by a predetermined distance. Herein, the distance between the stack bundles is such that there is enough space for receiving a pipe connected to each manifold and enough space for replacing the cell bundle.

In the present invention, the solid oxide fuel cell stack may consist of a single stack module as a minimum size of a stack. Alternatively, it may consist of a middle-sized stack manufactured by connecting the unit stack modules to each other in series in the air flow direction, and then vertically arranging the connected structures. Alternatively, it may consist of a stack manufactured by connecting only two stack modules to each other in series in the fuel gas direction and vertically arranging the connected structures.

In the present invention, in the solid oxide fuel cell stack, the manifolds for the air inlet and outlet in the stack modules are not connected with each other in series such that the connection is interrupted at a time point where the oxygen concentration of air is reduced to an unsuitable level (preferably 5% or less). These manifolds are repeatedly connected so as to face each other, so that air is introduced in a dispersed state, and thus a reduction in the air concentration is avoided.

In the present invention, in the solid oxide fuel cell stack, flat tubes in the stack module are stood up vertically and are repeatedly connected or arranged with each other to form a three-dimensional structure. This stack can also be operated while the fuel gas manifolds are maintained in a high temperature range (700° C. or higher) in which the sealing material melts.

In one embodiment of the present invention, in the manufacture of the cell module or the cell bundle, a flat bar of a sealing material is placed in the groove of the unit cell or the reformer, and the sealing material is melted by high-temperature sintering to perfectly seal the shell side of the tubes. For perfect sealing, the cell bundle is stood up vertically and then the sealing material is melted. In this case, the sealing material is deposited on the bottom of the sealing material grooves and spreads vertically and horizontally to provide a perfect seal. To prevent the sealing material from leaking out of the grooves, a ceramic or paste is applied to a portion of the bottom of the sealing material groove upon stacking and is sintered while being pressed.

In one embodiment of the present invention, a ceramic plate is attached to the central portion of the current collection plate, which is inserted into the hot box, and the current collection plate is covered and sealed. In this case, corrosion of the current collection plate by exposure to the air can be prevented.

In one embodiment of the present invention, a flat tube for manufacturing the reformer preferably has the same material, shape and size as does the unit cell. However, if necessary, it may be made of a material having no air channel on the outside thereof or a non-porous dense film. In this case, it is preferably consistent with the width and length of the unit cell in terms of the manufacture of a large-sized cell bundle and elaborate sealing.

In one embodiment of the present invention, the square ring-shape plug, which is inserted between the cell bundles on the rack and placed on the wall of the hot box, is manufactured such that it extends into the hot box and closes the vertical gap between the cell bundles in the hot box to prevent air from flowing in through the gap.

In one embodiment of the present invention, the front and rear walls of the hot box, through which air is introduced and discharged, are made of a thick wall in which small channel holes for air holes are uniformly distributed so that heat can be effectively blocked. If necessary, one or more plates having small random holes therein is additionally provided, and then manifolds for the air inlets or outlets are provided, so that the heat release of the heat box can be effectively blocked and the dispersion of air flow introduced into pipes can be effectively increased.

In one embodiment of the present invention, heat in the stack can be managed by controlling the flow of air. Preferably, the heat can be managed by placing an additional small-sized external reformer and controlling the ratio of reforming between the external reformer and the internal reformer.

In one aspect of the present invention, in the porous flat tube for the reformer, the surface of the internal surface and the external surfaces including the vertical passage, which come into contact with fuel gas, are coated with a dense film. In this case, the fuel gas is prevented from being unnecessarily reformed by contact with a metal (e.g., Ni) in the support, thereby the change in the physical property or the structural destruction of the porous support is prevented from being caused by the production of coke at high temperature.

In another aspect, the present invention provides a solid oxide fuel cell module comprising one or more flat-tubular reactors stacked on a flat tubular reformer, wherein the flat tubular reformer is closed at one side and has formed therein at least one first channel extending from an internal channel to the outside; the flat tubular reactor is closed at one side and has formed therein at least one second channel extending from an internal channel to the outside; a unit cell reaction portion and an air flow channel are formed on the outside of the flat tubular reactor; and the first channel communicates with the at least one second channel.

In still another aspect, the present invention provides a cell bundle wherein solid oxide fuel cell modules, each comprising one or more flat-tubular reactors stacked on a flat tubular reformer, are stacked vertically and/or horizontally, wherein the flat tubular reformer is closed at one side and has formed therein at least one first channel extending from an internal channel to the outside; the flat tubular reactor is closed at one side and has formed therein at least one second channel extending from an internal channel to the outside; a unit cell reaction portion and an air flow channel are formed on the outside of the flat tubular reactor; and the first channel communicates with the at least one second channel.

In still another aspect, the present invention provides a stack module comprising a plurality of cell bundles connected with each other in series and/or in parallel, wherein each of the cell bundles comprises a plurality of solid oxide fuel cell modules connected with each other in series and/or in parallel, wherein each of the solid oxide fuel cell modules comprises one or more flat-tubular reactors stacked on a flat tubular reformer, wherein the flat tubular reformer is closed at one side and has formed therein at least one first channel extending from an internal channel to the outside; the flat tubular reactor is closed on at least one side and has formed therein at least one second channel extending from an internal channel to the outside; a unit cell reaction portion and an air flow channel are formed on the outside of the flat tubular reactor; and the first channel communicates with the at least one second channel.

In still another aspect, the present invention provides a stack bundle wherein the stack modules are connected with each other in series and/or in parallel.

In still another aspect, the present invention provides a solid oxide fuel cell stack wherein the stack bundles are connected with each other in series and/or in parallel.

In still another aspect, the present invention provides a solid oxide fuel cell reformer wherein an electrically conductive flat-tubular support has formed therein an internal channel, one side of which is closed with a plug, wherein a vertical channel is formed at a portion near the plug so as to extend from the internal channel to the outside of the support, and the internal channel is coated with a reforming catalyst.

In still another aspect, the present invention provides a unit cell reactor for a solid oxide fuel cell, wherein two grooves for receiving a sealing material are formed around each of both other surfaces of an electrically conductive flat-tubular support having therein an internal channel; a vertical channel is formed between the grooves so as to extend to the external channel; an air channel consisting of one or more grooves is formed at the central portion of the outside of the support; one or more unit cells, each consisting of a first electrode, an electrolyte and a second electrode, is formed on the central portion of the outside of the support; an interconnection layer is formed on the lower surface of the support; and the outside of the support, excluding the unit cell and the interconnection layer.

Advantageous Effects

According to the present invention, an even number of unit cells and one reformer are electrically connected with each other in series to manufacture a monolith type cell module. The cell modules are arranged horizontally, and the arranged structures are vertically connected to each other in series, and a sealing material is placed in the sealing grooves. Cathode and anode current collecting plates are attached to the end cells, and gas manifolds are connected to the current collecting plates, and the resulting structures are sintered at high temperature to manufacture a cell bundle having a monolith structure. This cell bundle is structurally stable and can be easily structured by connecting small-sized unit cells in parallel, and the size thereof can be increased. Also, the endothermic reaction in the reformers included regularly in the cell bundle consumes the heat of the exothermic fuel cell reactions in the adjacent unit cells to reduce the temperature variation in the cell bundle. Moreover, the cell bundles are vertically and horizontally arranged, and a hot box is placed at the central portion, and fuel gas manifolds are held in open boxes at both sides outside the hot box, thereby manufacturing a stack module. In this stack module, a specific bundle can be replaced when it has trouble. The fuel gas manifolds and the manifolds for the air inlet and outlet in the stack modules are suitably connected to each other in the four directions to manufacture a stack bundle. The stack bundles are arranged vertically and the cell bundles are electrically connected in series and in parallel, thereby manufacturing a huge stack in which the unit cells are electrically connected with each other in series and in parallel and the cell bundles can be indefinitely expanded in a three-dimensional fashion.

In the stack thus manufactured, air is introduced through an air manifold at one side of the hot box on the stack module, passes through the shell side of each tube and is discharged through the opposite air manifold. Fuel gas passes through the fuel gas inlet manifold of the stack module and is introduced into the internal channel of each reformer, and the hydrocarbon-containing fuel gas is reformed into hydrogen and CO-containing gases, which then flow into the internal channel of each unit cell and are finally discharged out through the opposite manifold for discharging fuel gas. The cell bundles are electrically connected with each other in parallel so that the current and voltage can be controlled.

In addition, because the reformer is included in the cell bundles which are repeated in the stack, there is no temperature variation in the stack. Also, because the cell bundles have a monolithic structure, they are structurally stable and a specific cell bundle having trouble can be replaced.

BEST MODE

Hereinafter, preferred embodiments of the present invention will be described in detail with reference to the accompanying drawings, but the scope of the present invention is not limited to these embodiments.

Figure 1:
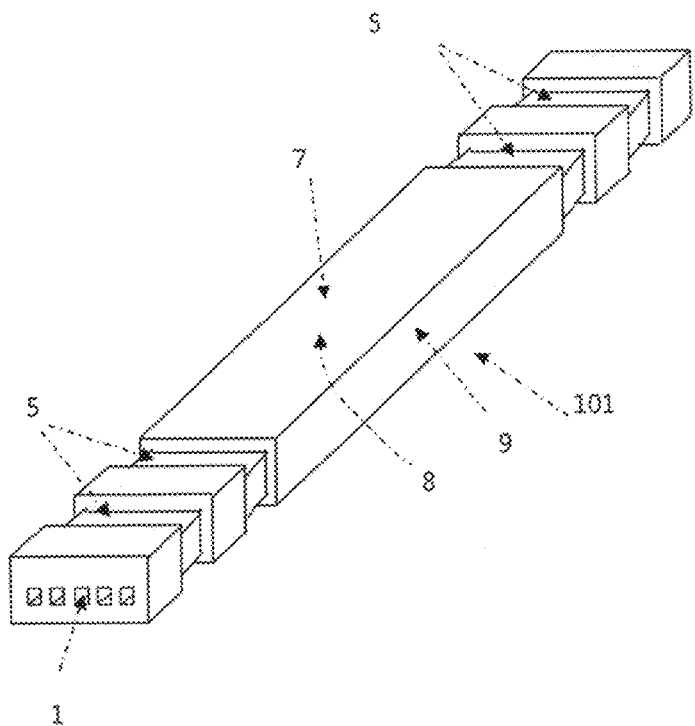
FIG. 1 is a perspective view showing a support in which a plurality of sealing material grooves are formed at portions near both sides of a flat tube for a solid oxide fuel cell according to the present invention.

As shown in FIG. 1, a flat-tubular porous support 101 for a solid oxide fuel cell according to the present invention comprises a fuel electrode material or is made of a third conductive material. It includes one or more internal channels 1 formed in the longitudinal direction, and comprises grooves 5 in which a sealing material is to be provided. With respect to the grooves 5, two grooves are formed along the four sides of a portion near each end of the support 101 and are spaced apart from each other by a predetermined distance. The grooves have a predetermined depth and width. The vertical thickness (height) of the support 101 is preferably as small as possible. Specifically, the vertical thickness of the support 101 is 10 mm or less, preferably 5 mm or less, and more preferably 3 mm or less. As the width and length of the support 101 increase, the size of the resulting stack increases. However, if the width and length of the support 101 are excessively large, it will be difficult to coat and sinter an electrolyte layer or an interconnection layer on the support 101. The support structure can be manufactured by making a flat tube using a method such as extrusion, and grooving the surface of the flat tube using a method such as grinding. Alternatively, it can also be manufactured by making two half-plates using a method such as pressing, attaching the two plates to face each other, and forming fuel gas flow channels in the attached structure and air flow channels on the outside of the structure. If necessary, the support is additionally processed by grinding the upper surface 7, the lower side 8 and the left and right sides 9, so that it has uniform thicknesses in the vertical and horizontal directions.

Figure 2:
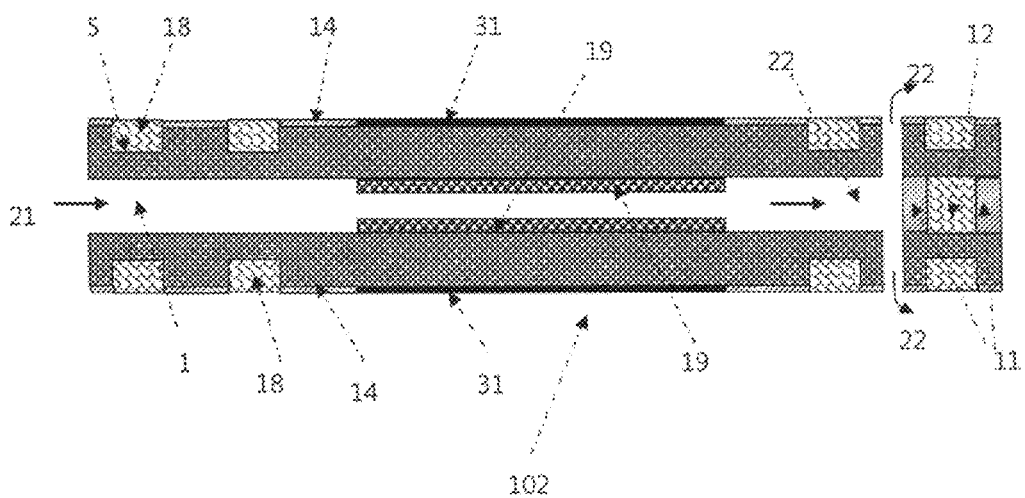
FIG. 2 is a vertical cross-sectional view of a reformer manufactured using the support for FIG. 1 for a solid oxide fuel cell according to the present invention.

FIG. 2 shows a method of manufacturing a reformer 102 using the support 101. As shown in FIG. 2, a ceramic plug 11 and a sealing bar 12 are sequentially inserted into one end of the internal channel of the support, and the support is stood up vertically. Then, the sealing material is melted to seal the internal channel, and a vertical passage 22 is formed between the sealing material grooves 5 using a method such as perforation, so that it is connected with the internal channel and extends to the outside of the support. Then, an interconnection layer 31 of a dense film is coated on the central portions of the upper and lower sides of the support, and a dense layer 14 of an electrolyte layer is formed on the internal channel 1 and the outside of the support excluding the interconnection layer 31, so that fuel gas is prevented from coming into contact with the support. Then, a reforming catalyst 19 is provided in the internal channel 1 and coated on the inner wall of the internal channel 1, thereby completing the reformer 102. When a unit cell is provided, a sealing material plate 18 is placed in the sealing material groove 5 and sintered. During operation, fuel gas flows into an inlet 21 and is reformed on the reforming catalyst in the internal channel into hydrogen and CO-containing gases which then flow into the adjacent unit cells through an outlet consisting of the vertical passage 22.

Figure 3:
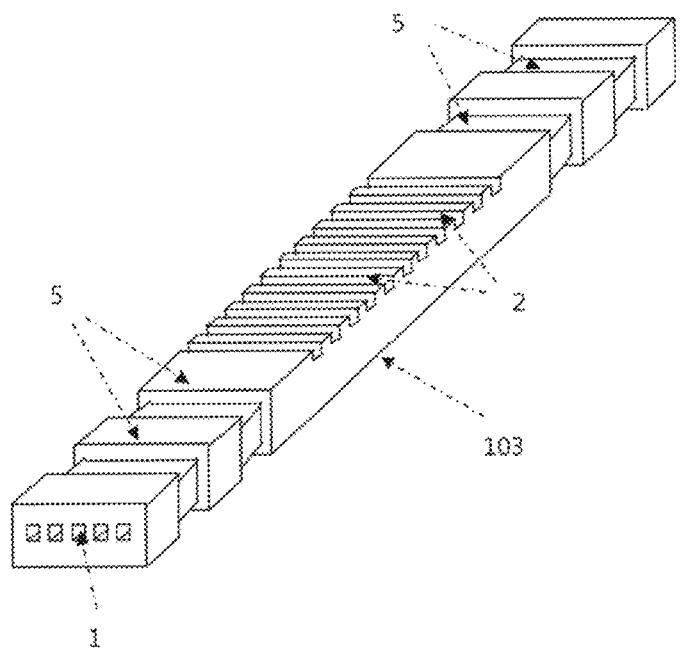
FIG. 3 is a perspective view showing that an air flow channel is formed on the upper flat surface of the support for FIG. 1 for a solid oxide fuel cell according to the present invention.
Figure 4:
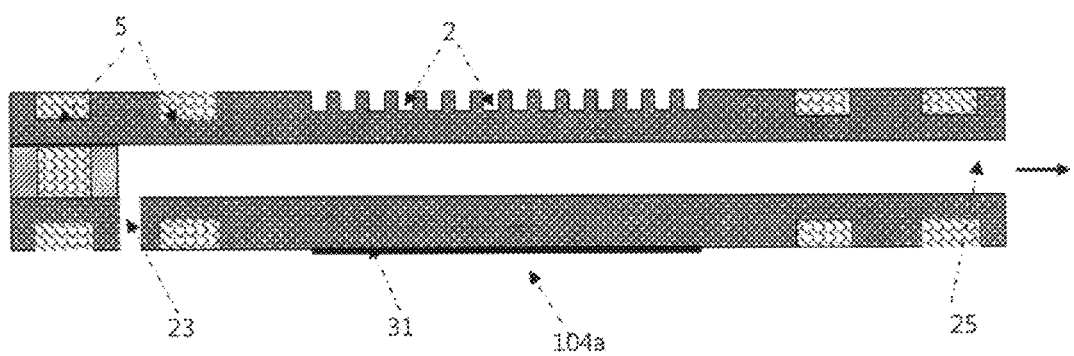
FIG. 4 is a horizontal cross-sectional view showing the range of coating of an interconnection material and an example of an internal vertical passage in the support for FIG. 1 for a solid oxide fuel cell according to the present invention.
Figure 5:
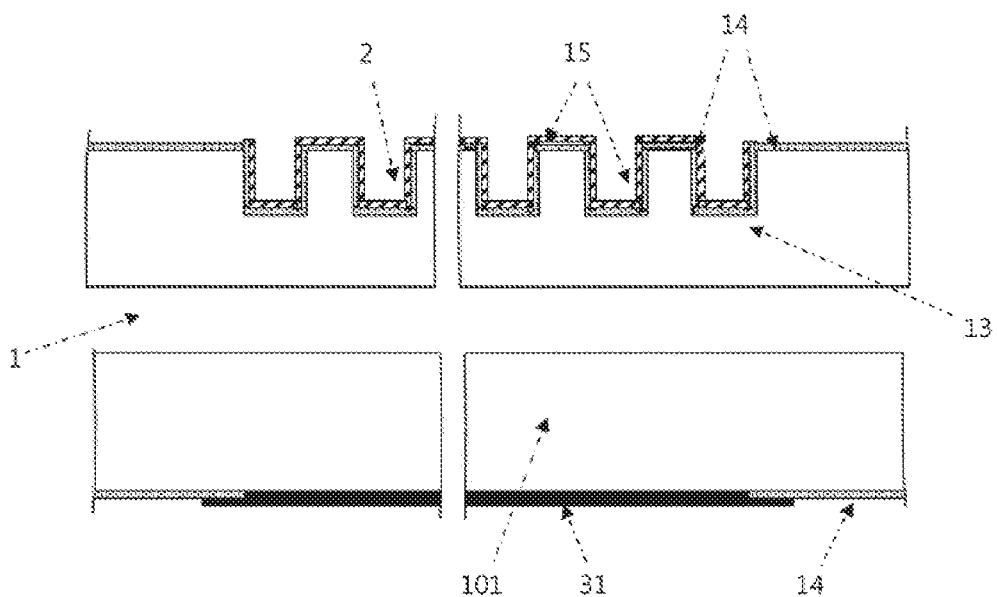
FIG. 5 is a vertical cross-sectional view showing an electrode for forming a unit cell layer and a coating state of an electrolyte on the reaction portion of FIG. 3 for a solid oxide fuel cell according to the present invention.

FIGS. 3 to 5 show an example of manufacturing a unit cell 103 using the support 101. As shown in FIG. 3, air flow channels 2 are formed on the central portion of the upper surface 7 of the support in the perpendicular direction in the form of protrusions and depressions. In addition to the perpendicular direction, the air channels may also be formed in a combination of the lengthwise direction and the widthwise direction or formed in a checkered pattern. The air channels may have any shape, as long as air flow can be formed in the perpendicular direction when the supports are vertically stacked. In addition, the air channels may also be formed on the lower surface 8 which is not the upper surface 7, or may be formed on both the upper and lower surfaces 7 and 8 so that the channel depth is increased upon stacking or the thickness of the support is reduced. Then, as shown in FIG. 4, a ceramic plug 11 and a sealing bar 12 are inserted into the end of the internal channel and sintered to seal the internal channel. Then, a vertical passage 23 is formed between the sealing material grooves so that it extends from the internal channel to the outside. Then, as shown in FIG. 5, the air channel portion of the upper surface 7 is coated sequentially with an anode (fuel electrode) layer 13, an electrolyte layer 14 and a cathode (air electrode) layer 15, and the central portion of the lower surface 8 is coated with an interconnection layer 31, and the remaining portion of the lower surface 8 is coated with an electrolyte layer 14. Then, the upper and lower flat surfaces are individually or simultaneously sintered, thereby forming porous electrode layers and dense electrolyte and interconnection layers. When the support 101 is made of a fuel electrode material, coating of the fuel electrode layer 13 may also be omitted. The electrode-electrode assembly of the anode layer 13, the electrode layer 14 and the cathode layer 15 may be formed on the air channel 2 or on the surface of the upper flat surface excluding the air channel, and in this case, the interconnection layer should be formed on the opposite flat surface so as to be connected with the inside of the support 101. The interconnection layer 31 may also be formed by a dry coating method such as plasma spray or vapor deposition, in addition to the coating and sintering processes.

Figure 6:
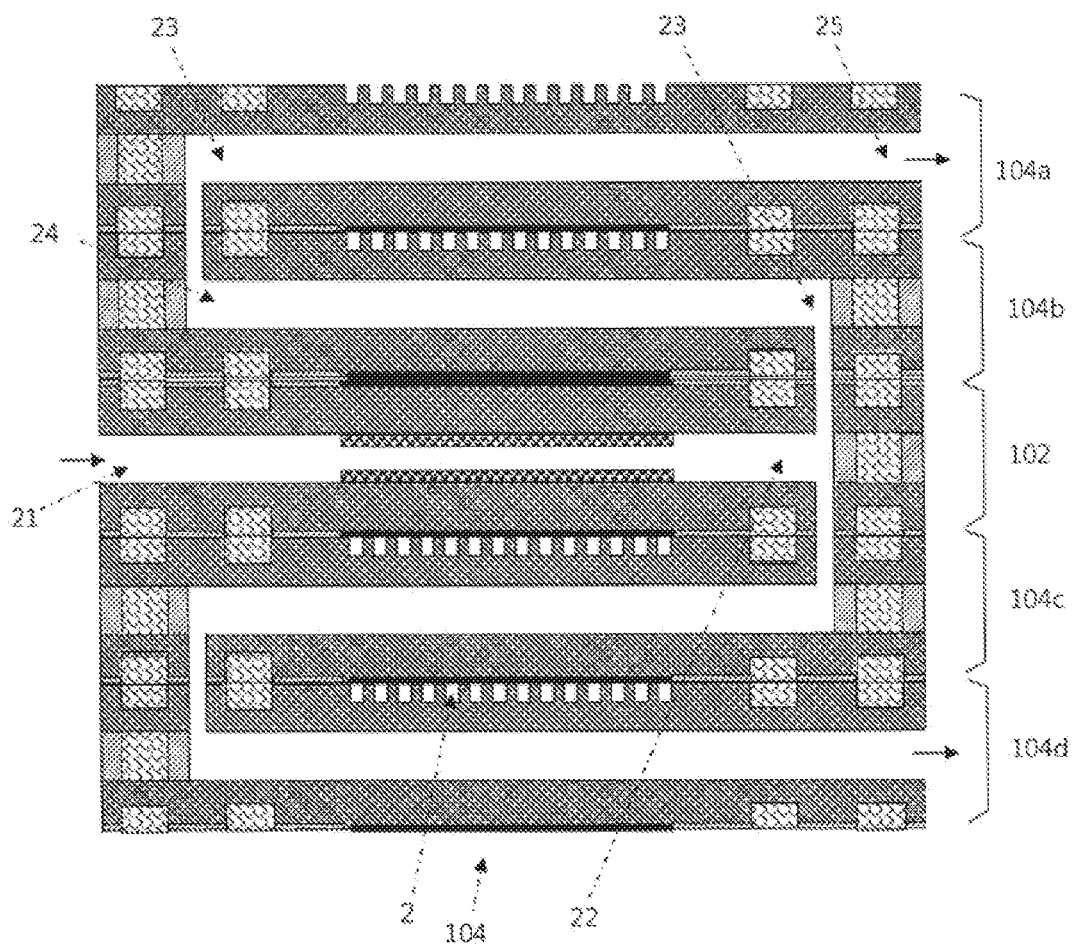
FIG. 6 is a vertical cross-sectional view showing a cell module manufactured by two unit cells of FIG. 5 on each of the upper and lower sides of the reformer of FIG. 2 for a solid oxide fuel cell according to the present invention.

FIG. 6 shows a cell module 104 of a monolithic structure manufactured by depositing unit cells 104a-104d on the upper and lower surfaces of the reformer 102. As shown in FIG. 6, in the unit cells 104b and 104c adjacent to the upper and lower surfaces of the reformer 102, both ends of the internal channel are all closed, and at one end of the internal channel, a vertical passage is formed through the lower flat surface, and at the other end, a vertical passage is formed through the upper flat surface. Then, in the unit cells 104a and 104d, only one end of the internal channel is closed, and a vertical passage is formed through the upper or lower flat surface. Thus, a hydrocarbon-containing fuel gas introduced into the inlet 21 of the reformer is reformed on the reforming catalyst into hydrogen and CO-containing gases which then pass from the outlet 22 through the vertical passages of the adjacent unit cells to the inlets 23 and flow to the outlet 24. Then, the gases pass through the vertical passages of the subsequent unit cells to the inlet 23, flow in a zigzag fashion, and are finally discharged through the outlet 25 disposed at a side opposite the inlet of the reformer. It is required that an even number of the unit cells are deposited above and below the reformer so that the fuel gas is introduced through one side of the reformer and disposed through the other side. The gas that flows from the internal channel 1 through the vertical passages to the outside of the cell module can be prevented from making contact with air and can flow only through the internal channels, because the gaps in the module are sealed radially by the sealing material provided in the sealing material grooves placed at both sides of the vertical passages so as to create a fuel gas chamber including the vertical passage. Thus, the cell module is manufactured by stacking the unit cells. In the stacking process, a conductive interconnection material or a cathode material slurry are additionally applied on the interconnection layer and the unit cell layer, and a ceramic material paste is applied to both sides of the sealing material grooves, and the resulting unit cells are dried at a high temperature at which the sealing material does not melt, preferably a temperature of 600° C. or lower, followed by sintering, thereby forming a monolithic structure in which the reformer and the unit cells are electrically connected with each other in series and structurally integrated with each other.

Figure 7:
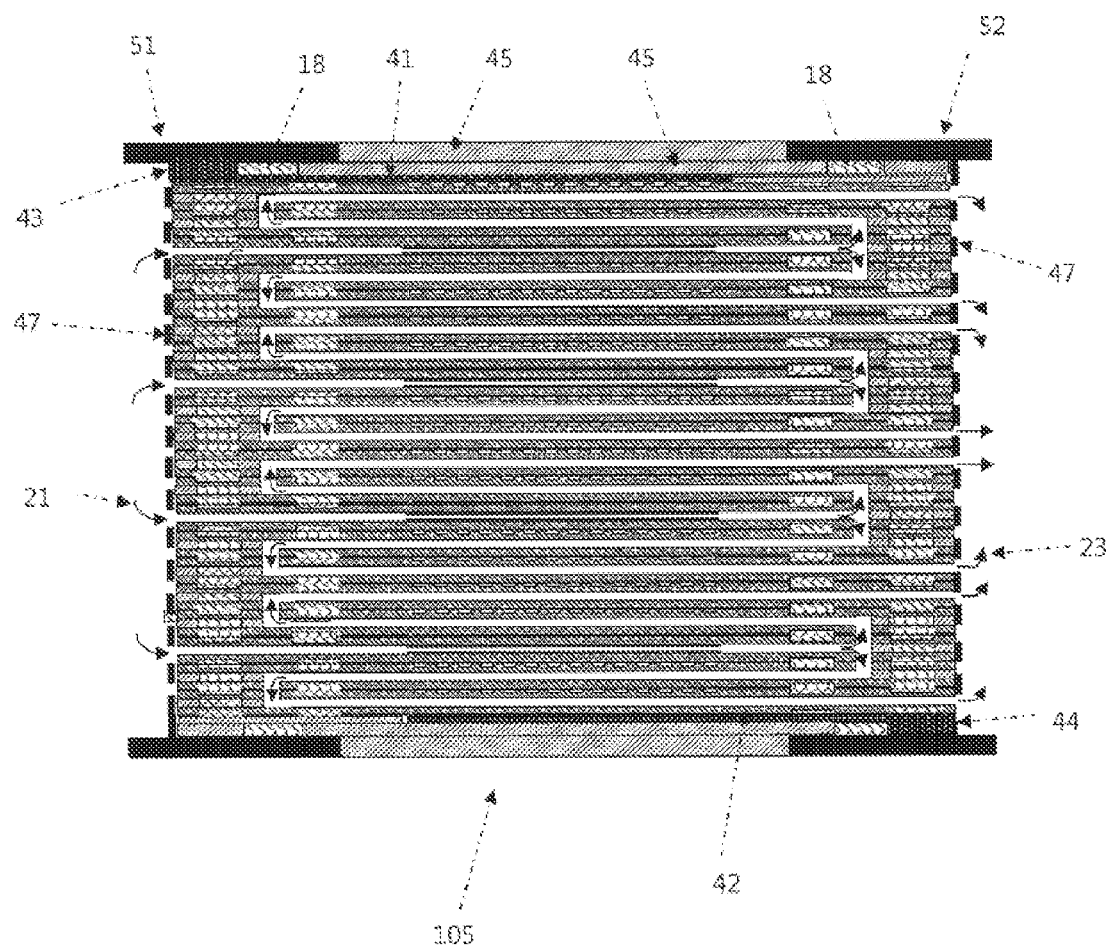
FIG. 7 is a vertical cross-sectional view showing a cell bundle manufactured by vertically stacking four cell modules of FIG. 6 for a solid oxide fuel cell according to the present invention.

FIG. 7 shows a vertical cross-sectional view of a cell bundle, which is used as a basic unit in the manufacture of a stack and was manufactured by horizontally arranging a plurality of the cell modules and vertically stacking the arranged cell modules. As shown in FIG. 7, four cell modules are stacked so that they are electrically connected with each other in series. Although not shown in FIG. 7, the stacked cell modules are preferably arranged in the horizontal direction so that they are electrically connected with each other in parallel. In the stacking process, a sealing material is provided in the sealing material grooves in the cell modules, as in the stacking of the unit cells, and an interconnection material and a cathode material slurry are applied to the cathode layer adjacent to the interconnection layer on the cell module, and a ceramic paste is applied to both sides of the sealing material grooves. The resulting cell modules are dried and sintered while applying vertical and horizontal pressure thereto, thereby manufacturing a cell bundle base in which the cell modules are electrically connected and structurally integrated. Then, current collecting plates 41 and 42 are attached to the lowest and highest cells of the cell bundle base, and gas manifolds 51 and 52 are disposed so as to extend to perforated plates 47 which provide cell bundle support. Herein, the upper anode current collecting plate 41 is electrically connected to the left manifold 51 through an electrically insulating material 43, and the lower anode current collecting plate 42 is electrically connected to the right manifold 52 by an electrically insulating material 44. Moreover, a ceramic paste fills the space between the inner wall of the gas manifold and the outer surface of the cell bundle, and a sufficient amount of a sealing material fills the right portion. Then, the resulting structure is stood up vertically and sintered at high temperature, preferably 700° C. or higher, so that the glass sealing material melts and spreads between the cell modules and the outer surface of the cell bundle and the inner wall of the manifold in a state in which it is deposited on the bottom of the sealing material grooves or on the sintered ceramic paste. Finally, the temperature of the structure is reduced to a low temperature so that the sealing material solidifies, thereby manufacturing a cell bundle 105.

Figure 8:
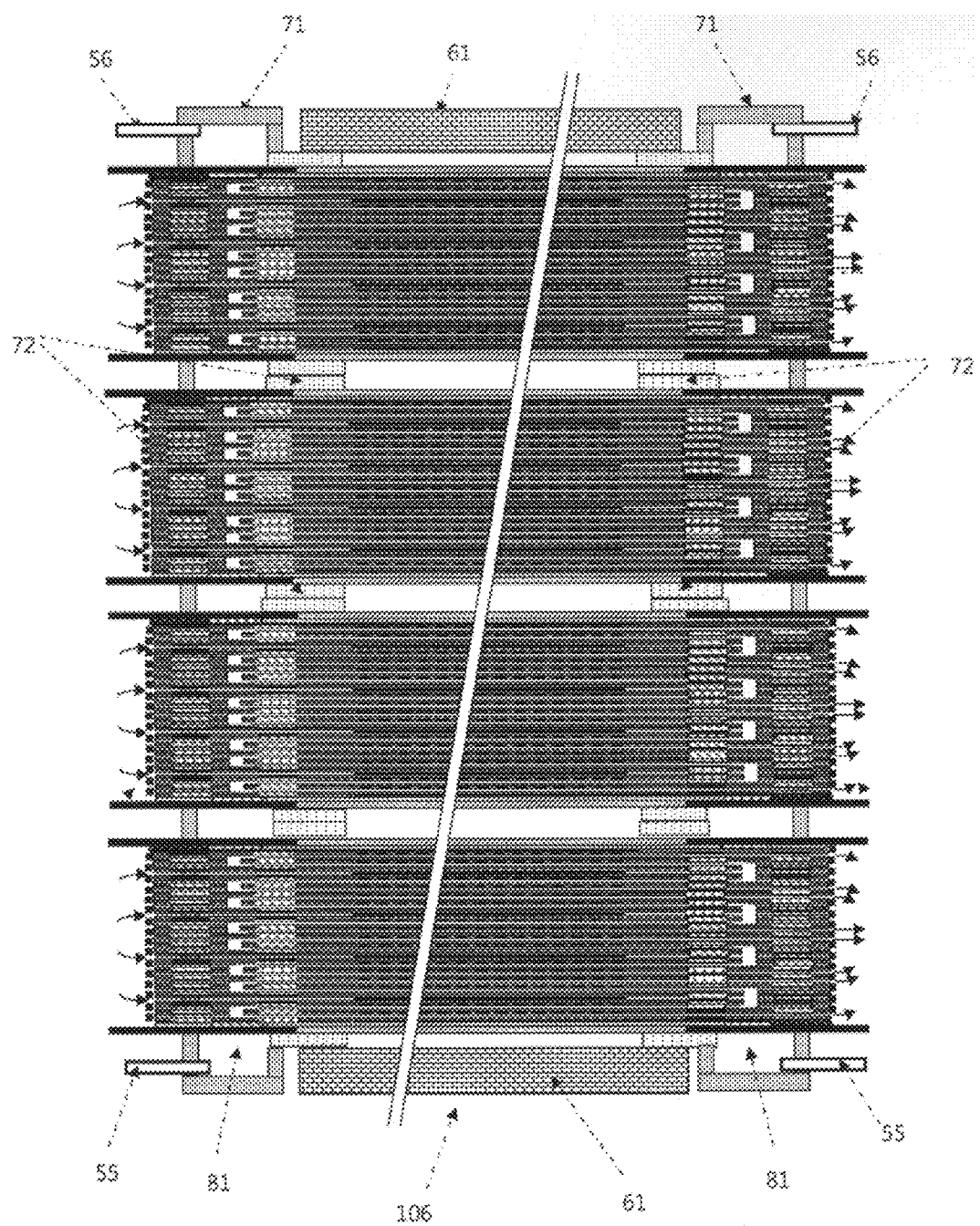
FIG. 8 is a vertical cross-sectional view showing a stack module manufactured by vertically stacking four cell bundles of FIG. 7 for a solid oxide fuel cell according to the present invention.

FIG. 8 shows a vertical cross-sectional view of a unit stack module by arranging the cell bundles in a 4×4 matrix. The air channel portion at the central portion of the cell bundle is disposed in a hot box 61, and portions of the fuel gas manifolds at both sides are disposed in an open box provided on a double-wall rack 71. Then, a square ring-shaped plug made of an electrically non-conductive and heat-insulating material is disposed between the cell bundle and the wall of the hot box in order to isolate the heat of the hot box and to prevent current transfer between the rack and the cell bundle. Finally, the square ring-shaped space between the cell bundle on the outer surface on the double-wall rack and the open box is closed to create an air cooling chamber 81, and cooling air is blown into a chamber inlet 55 so that the temperature of the gas manifold is maintained at a constant temperature, preferably 600° C. or lower, at which the sealing material does not melt, thereby preventing the sealing material of glass from melting in the manifold.

Figure 9:
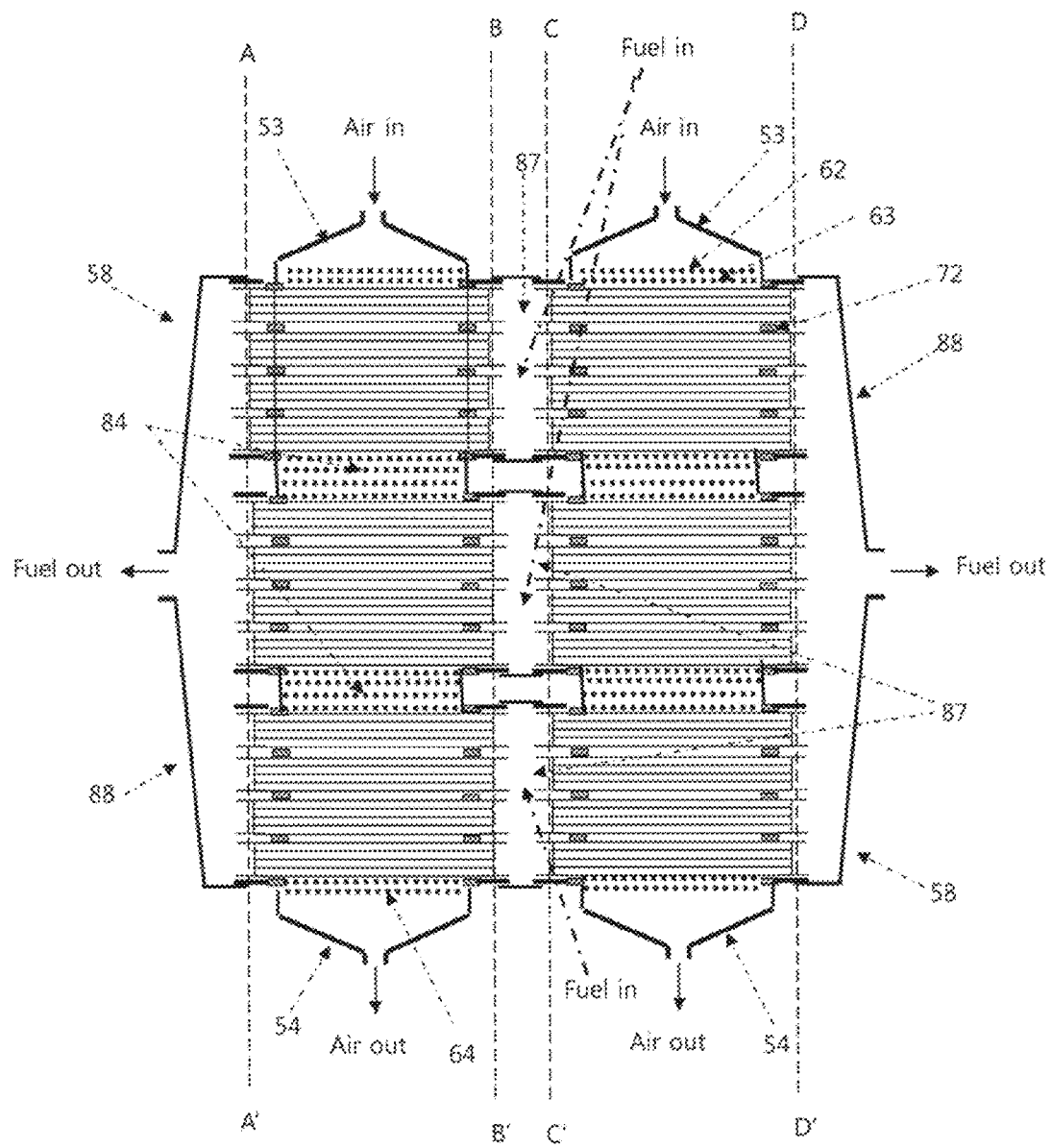
FIG. 9 is a horizontal cross-sectional view showing a final stack bundle manufactured by arranging stack modules of FIG. 8 in a 2×3 matrix, for a solid oxide fuel cell according to the present invention.

FIG. 9 is a horizontal cross-sectional view of a stack bundle 107 manufactured by horizontally connecting two unit stack modules 106 having 4×4 cell bundles to each other by means of the fuel gas inlet manifolds 57 and connecting the resulting structures, each obtained by this connection, to each other in series by means of the air inlet manifolds 53 and the air outlet manifolds 54. As shown in FIG. 9, air is introduced into the air inlet manifold 53 formed through the wall of the hot box in each stack module 106, and passes through an air inlet/outlet manifold 84 and is finally discharged out through the air outlet manifold 54. Fuel gas is introduced into the fuel gas inlet manifold 87 and discharged through fuel gas outlet manifolds provided at both sides.

Figure 10:
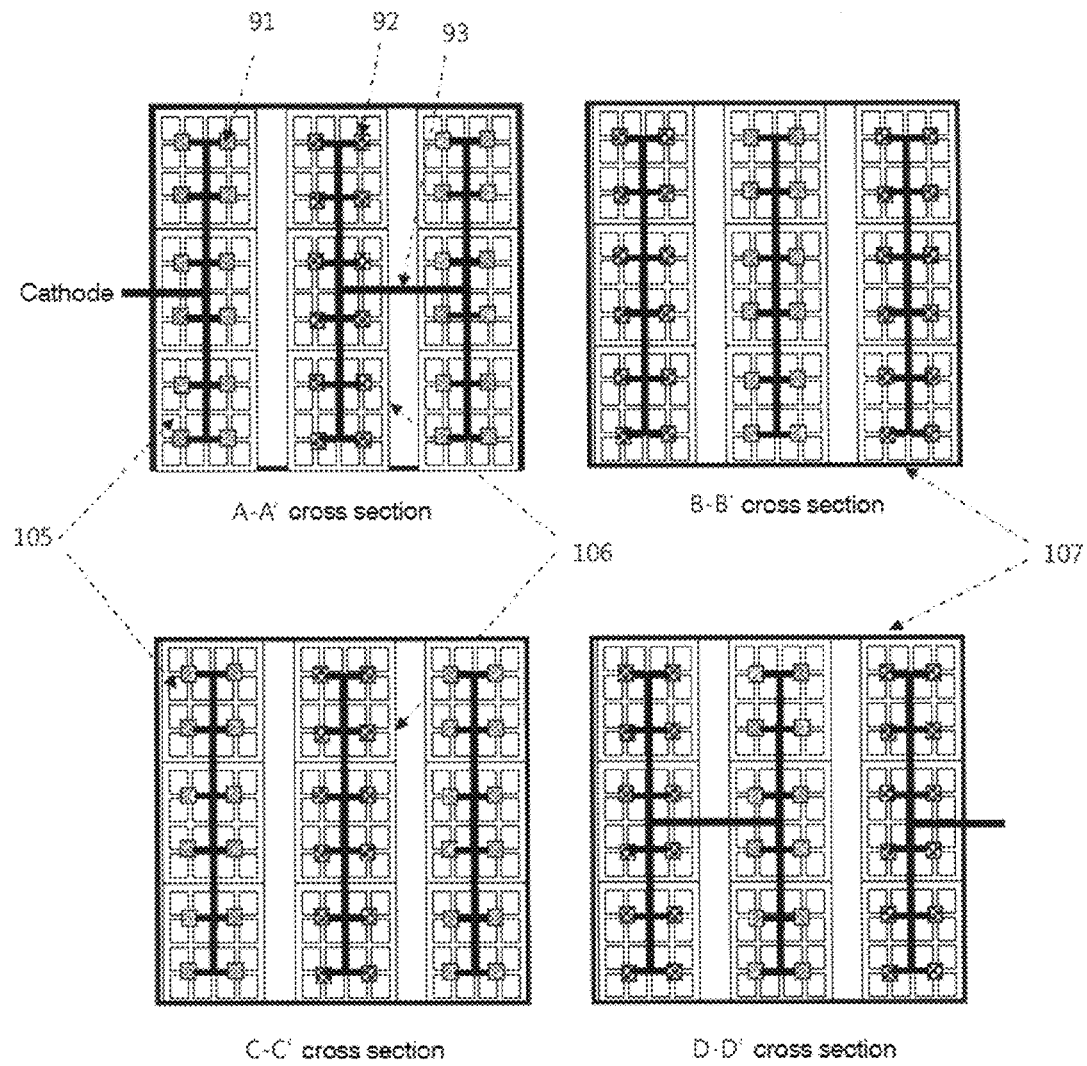
FIG. 10 is a set of vertical cross-sectional views showing electrical connections between electrodes on manifolds at four places when the three cell bundles each shown in FIG. 9 are vertically stacked.

FIG. 10 shows four cross-sectional views taken along lines A-A', B-B', C-C' and D-D' of FIG. 9, which show portions near the fuel gas inlet and outlet manifolds when three stack bundles of FIG. 9 are stacked vertically so that 16 (2×3×3) stack modules are stacked. For reference, the cross-sectional views of FIG. 10 show the end cross-section of the fuel gas manifold in each cell bundle when viewed from left to right and also show the electrical connection between the cell bundles. As shown in the cross-sectional view A-A' of FIG. 10, 4×4 cell bundles per stack module are connected in parallel, and three stack modules are connected in parallel so that 48 (4×4×3) cell bundles are connected in parallel. The fuel gas manifolds in the three stack modules serve as anodes. Then, the cathode manifolds in the B-B' cross-section are connected in series with the anode manifolds in the C-C' cross section, and the left cathode manifolds in the D-D' cross section are connected in series with the right anode manifolds. Then, the cathode manifolds in the C-C' cross section are connected with the manifolds in the B-B' cross section, and the middle cathode manifolds in the A-A' cross section are connected with the right anode manifolds. Then, the cathode manifolds in the B-B' cross section are connected with the anode manifolds, and finally the cathode manifolds in the D-D' cross section are exposed to the outside.

Thus, in the stack, series connection is performed a total of 6 times, and finally 48 cell bundles connected in parallel have 6 series connections. If the unit cells in the cell bundle are stacked to have 20 series connections and 4 parallel connections, the resulting stack has 192 (48×4) parallel connections and 120 (6×20) series connections between unit cells. This stack consists of 120 unit cells having a large area of 300 cm$^2$×192=57,600 cm$^2$, even if the size of the unit cell is as small as 5 cm (width)×50 cm (length). If the unit cell realizes a powder of 0.2 W/cm$^2$, and if the size of the planar tube is 0.4 cm (thickness)×4.0 cm (width)×60 cm (length), and if the effective unit cell length is 50 cm (5 cm at both ends thereof is used as a gas manifold), and if 20 unit cells and 5 reformers per cell bundle are stacked, and if 4 cell bundles, each obtained by this stacking, are horizontally arranged, the final size of the cell bundles is 10 cm (thickness)×12 cm (width)×60 cm (length). If the cell bundles are arranged in a matrix of 4×4=16 and are at a distance of 1.0 cm from each other, the size of the unit stack module is 43 cm (thickness)×51 cm (width)×60 cm (length). If the stack modules are arranged in a matrix of 2 (fuel gas flow direction)×3 (air flow direction)×3 (vertical direction) as shown in FIGS. 9 and 10 and the length of the manifold is set at 5 cm, the resulting stack has a total volume of 3.44 m$^3$ (150 cm (thickness)×170 cm (width)×135 cm (length)). This stack consists of 120 unit cells having an area of 5.76 m$^2$ and generates a power of 1.38 MW, suggesting that it is a huge stack. Thus, in order to a generate a power of about 10 MW, the stack modules are arranged in a matrix of 4 (fuel gas flow direction)×6 (air flow direction)×6 (vertical direction), and in this case, a total volume of 3.0 m×3.4 m×2.7 m=2.7 m$^3$ is required, and technical or operational problems resulting from arrangement of the stack modules do not arise.

DESCRIPTION OF THE REFERENCE NUMERALS IN THE DRAWINGS

1: internal channel for fuel gas flow in a flat tube for a solid oxide fuel cell;

2: external air channel formed on one surface of a flat tubular plate for a solid oxide fuel cell in the widthwise direction;

5: grooves for receiving a sealing material;
7: upper flat surface of a support;
8: lower flat surface of the support;
9: both side surfaces of the support;
11: ceramic plug for gas sealing provided in the internal channel;
12: sealing plug for gas sealing provided in the internal channel;
13: coated anode layer in a unit cell layer;
14: electrolyte layer formed of a dense film on the external flat surface of a reformer or a unit cell;
15: cathode layer coated on a unit cell;
18: sealing material formed into a bar or a plate in sealing material grooves;
19: hydrocarbon reforming catalyst coated in a reformer;
21: fuel gas inlet in a reformer;
22: vertical passage for discharging reformed gas from a reformer;
23: vertical passage for introducing hydrogen-containing gas into a unit cell;
24: vertical passage for discharging hydrogen-containing gas into a unit cell;
25: outlet for discharging final waste gas from a unit cell;
31: interconnect layer formed of a dense film on the unit flat surface of a reformer or a unit cell and connected to the inside of the support;
41: cathode current collecting plate in a cell module;
42: anode current collecting plate in a cell module;
43: electrical interconnection between a cathode current collecting plate and a fuel gas manifold;
44: electrical interconnection between an anode current collecting plate and a fuel gas manifold;
45: ceramic plate for air supply on a current collecting plate;
47: perforated plate for cell bundle support in a fuel gas manifold;
51: fuel gas manifold connected to cathode current collecting plate;
52: fuel gas manifold connected to an anode current collecting plate;
53: air inlet manifold;
54: air outlet manifold;
55: air inlet in a fuel gas manifold cooling chamber;
56: air outlet in a fuel gas manifold cooling chamber;
57: air gas inlet manifold;
58: fuel gas outlet manifold;
61: hot box;
62: perforated plate for hear isolation and air dispersion in air inlet and outlet manifolds;
63: perforated wall surface for air inlet in a hot box;
64: perforated wall surface for air outlet in a hot box;
71: rack for holding a fuel gas manifold in a cell bundle;
72: square-shaped ceramic plug for providing electrical insulation between a cell bundle and a rack and for providing heat insulation between gaps of a hot box;
81: air chamber for fuel gas manifold cooling;
84: air inlet/outlet manifold;
85: air inlet manifold;
86: air outlet manifold;
87: fuel gas inlet manifold;
88: fuel gas outlet manifold;
91: anode current collecting plate for connection between cell bundles;
92: cathode current collecting plate for connection between cell bundles;
93: electrical interconnection between a cell bundle-connecting anode current collecting plate and a cell bundle-connecting cathode current collecting plate;
101: flat-tubular support;
102: reformer manufactured from the support;
103: a support having an air channel formed on the external flat surface;
104a: distal unit cell stacked above a reformer in a cell module;
104b: cell module stacked adjacent to the upper surface of a reformer in a cell module;
104c: unit cell stacked adjacent to the lower surface of a reformer in a cell module;
104d: distal unit cell stacked below a reformer in a cell module;
105: cell bundle manufactured by horizontally arranging cell modules and vertically stacking the arranged structures; and
106: stack module manufactured by vertically and horizontally arranging cell bundles.

The invention claimed is:

1. A cell module for a solid oxide fuel cell, which comprises at least one flat-tubular reactor stacked on a flat-tubular reformer,
wherein the flat-tubular reformer is closed on one side and has formed therein at least one first channel extending from an internal channel to the outside,
the flat-tubular reactor is closed on one side and has formed therein at least one second channel extending from an external channel to the outside,
a unit cell reaction portion and an air flow channel are formed on the outside of the flat-tubular reactor; and
the first channel communicates with the at least one second channel, wherein the first channel is formed vertically near the closed side so as to extend from the internal channel to the outside, and the second channel is formed vertically near the closed side so as to extend from the internal channel to the outside.

2. The cell module of claim 1, wherein raw material gas is reformed in the reformer, and introduced into the internal channel of the flat-tubular reactor through the first channel and the second channel, and discharged after reaction.

3. The cell module of claim 1, wherein the first and second channels are formed between two sealing material grooves formed in each of portions near both sides of the reactor and/or the reformer.

4. The cell module of claim 1, wherein the flat-tubular reformer is made of a conductive porous material, and the outside central portion of the reformer is coated with a dense interconnection material, portions of the outside of the reformer, excluding the interconnection material, is coated with a dense electrolyte, and at least a portion of the internal channel of the reformer is coated with a reforming catalyst.

5. The cell module of claim 1, wherein the flat-tubular reactor is made of a conductive porous material, and at least one air flow channel is formed at the outside central portion of the reactor, and a reaction portion on the central portion of the upper surface of the reactor, and an interconnection layer is formed on the lower surface of the reactor.

6. The cell module of claim 1, wherein the an even number of the flat-tubular reactors are stacked on each of the upper and lower surfaces of the reformer, and a waste gas outlet of the flat-tubular reactor is formed opposite an inlet of the reformer.

7. The cell module of claim 1, wherein the internal channel of the flat-tubular reformer is coated with a reforming catalyst.

8. The cell module of claim 1, wherein at least one air flow channel is formed on the upper surface of the flat-tubular reactor, and a fuel electrode, an electrolyte and an air electrode are sequentially coated on the groove, thereby forming at least one unit cell.

9. The cell module of claim 1, wherein the cell modules are stacked in series.

10. A cell bundle comprising the cell modules of claim 1, which are stacked vertically and/or horizontally.

11. The cell bundle of claim 10, wherein a current collecting plate is attached to the upper and lower sides of the bundle, and a gas manifold is attached to the left and right sides of the bundle in such a manner that the manifold on one side of the bundle is electrically connected with the upper side and the manifold on the other side is electrically connected with the lower side.

12. A stack module comprising cell bundles connected with each other in series and/or in parallel, wherein each of the cell bundles comprises a plurality of the cell modules of claim 1, which are stacked vertically and horizontally, and a current collecting plate is formed on the upper and lower sides of the stacked cell modules.

13. A stack bundle comprising a plurality of stack modules electrically connected with each other in series and/or parallel, wherein each of the stack modules comprises a plurality of cell bundles electrically connected with each other in series and/or in parallel, wherein each of the cell bundles comprises a plurality of the cell modules of claim 1, which are stacked vertically and horizontally, and a current collecting plate is formed on the upper and lower sides of the stacked cell modules.

14. A stack for a solid oxide fuel cell, which comprises a plurality of the stack bundles of claim 13, which are connected with each other in series and/or in parallel.

* * * * *